Aug. 11, 1942.   T. E. HYNEK   2,292,523
FLAG HOLDER
Filed Jan. 31, 1941
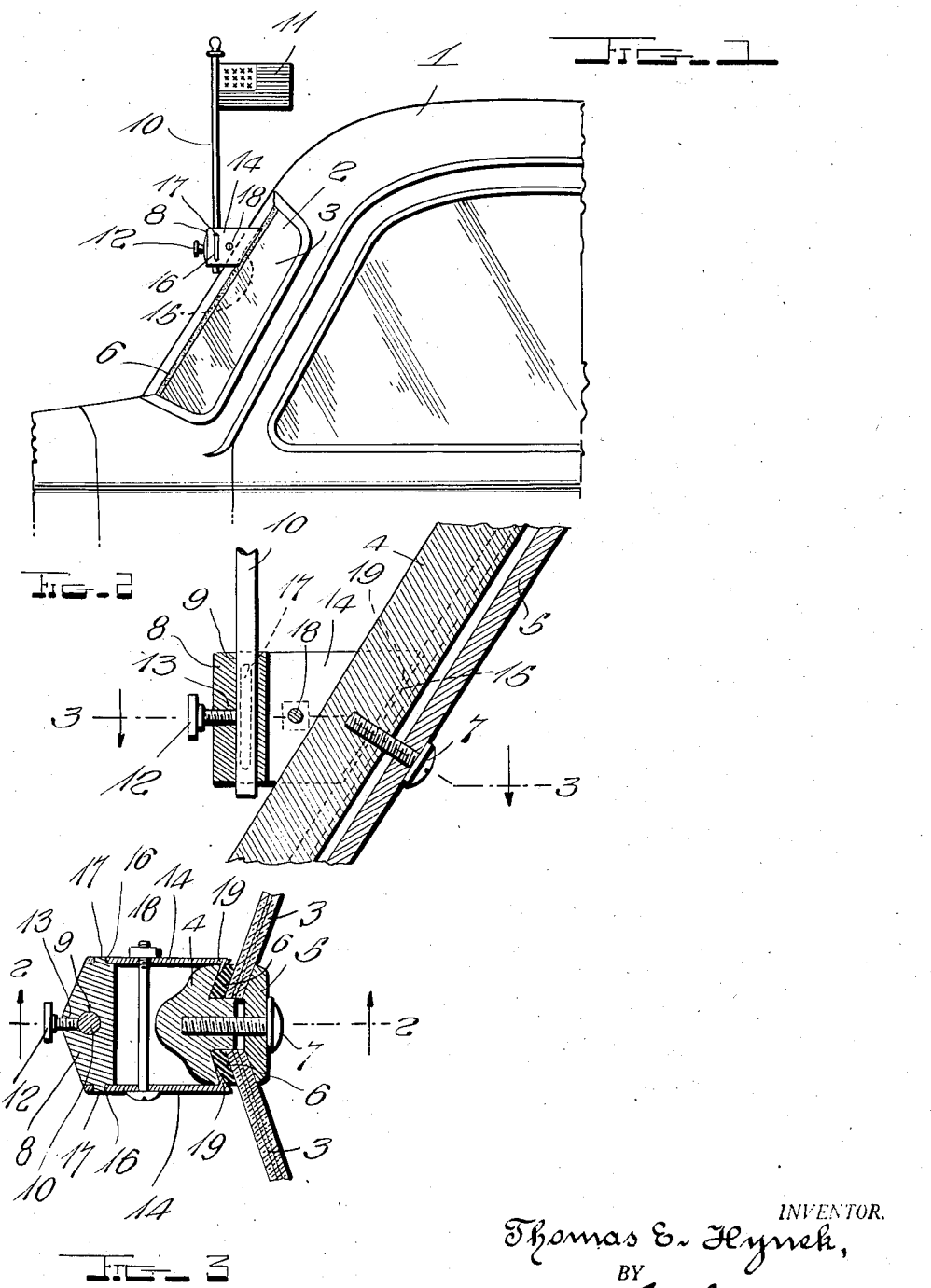
INVENTOR.
Thomas E. Hynek,
BY
ATTORNEY Patented Aug. 11, 1942

2,292,523

UNITED STATES PATENT OFFICE 2,292,523

FLAG HOLDER

Thomas E. Hynek, Chico, Calif.

Application January 31, 1941, Serial No. 376,905

2 Claims. (Cl. 248—41)

This invention relates to flag holders and more particularly to a flag holder adapted to be applied to an automobile, or other vehicle, and support a flag as a decoration.

One object of the invention is to provide a flag holder of such construction that it may be applied to the windshield and support a flag in upright position, the holder being neat in appearance and not detracting from the appearance of the car.

Another object of the invention is to so form the holder that jaws thereof may have gripping engagement with a partition between two windshield glasses where it will be firmly mounted and so located that it will not obstruct the view of the driver of the car.

Another object is to provide a flag holder wherein the jaws are firmly carried by the body portion or bridge of the holder but may be detached therefrom if so desired.

Another object of the invention is to provide a flag holder having jaws formed with claws adapted to engage between the center bar of the windshield and packing for the windshield glasses where they are firmly held by the grip of the jaws and also by pressure of the packing which is compressed by securing screws which hold the retainer strips for the glass in place.

In the accompanying drawing:

Fig. 1 is a view showing a portion of an automobile and a flag mounted thereon by a flag holder of the improved construction.

Fig. 2 is a sectional view on an enlarged scale showing the flag holder applied to the center bar of the windshield, the view being on the line 2—2 of Fig. 3.

Fig. 3 is a transverse sectional view on the line 3—3 of Fig. 2.

The automobile, indicated in general by the numeral 1, is of conventional construction and has the usual windshield 2 consisting of two panes of glass 3 disposed at opposite sides of a center bar 4 against which they are held by strips 5. Packings 6 of rubber or other suitable material are provided between marginal portions of the glass panes and shoulders of the bar 4 and, when the securing screws 7 are tightened, the packing will be compressed to form sealed joints and prevent rattling of the glass. This is conventional construction and it is to be understood that use of the improved flag holder is not limited to a windshield of the specific construction shown, as it may be applied to any windshield having a center bar between its glass panes.

The improved flag holder has a thick bridge or body 8 formed with a vertical bore or socket 9 to receive the staff 10 of the flag 11 and, in order that the staff may be firmly but removably held in the socket, there has been provided a set screw 12 which passes through an opening 13 formed in the bridge. Arms 14, formed of resilient metal, extend from opposite sides of the bridge and have their free ends 15 cut diagonally so that they conform to the incline of the center bar 4 of the windshield. The outer or front ends of the arms are formed with vertical slots or openings 16 to snugly receive tongues or lugs 17 which project from ends of the bridge 8. A bolt 18 passes through the arms, as shown in Fig. 3, and when this bolt is tightened, the arms will be firmly held in engagement with the bridge. The bolt also serves to draw the free ends of the arms toward each other and lips or flanges 19, formed along the free edges of the arms, will be held between the packing 6 and shoulders of the center bar 4 of the windshield. These flanges are tapered for wedging fit between the packing and the center bar and, since the arms are held in close contacting engagement with the sides of the center bar, the arms or jaws will have firm gripping engagement with the bar and the flag holder prevented from accidentally slipping out of place. In view of the fact that the flag holder is of only slightly greater width than the center bar of the windshield, it will not obstruct the view of a person driving the automobile.

Having thus described the invention, what is claimed is:

1. A flag holder comprising a bracket having a body constituting a bridge and formed with a socket for receiving a flag staff, projections extending from opposite side faces of the body, arms extending from opposite sides of the body with their forward portions overlapping the body and formed with seats receiving said ribs, said arms having portions adapted for gripping engagement with a center bar of a windshield, and means for holding the arms in operative engagement with the body.

2. A flag holder comprising a bracket having a body constituting a bridge and formed with a socket for receiving a flag staff, projections extending from opposite sides of the body, arms extending from opposite sides of the body with their forward portions overlapping the body and formed with openings snugly receiving said ribs, said arms having portions adapted for gripping engagement with a center bar of a windshield, and a bolt passing through said arms rearwardly of the body for holding the arms in engagement with the body and exerting pressure on the arms to hold their free ends in gripping engagement with the center bar of the windshield.

THOMAS E. HYNEK.